United States Patent
Doorgeest (10) Patent No.: US 9,616,336 B2
(45) Date of Patent: *Apr. 11, 2017

(54) METHODS AND APPARATUS FOR GAMING (71) Applicant: Dazzletag Entertainment Limited, Valleta (MT)

(72) Inventor: Mark Doorgeest, Gibraltar (GB)

(73) Assignee: Dazzletag Entertainment Limited, Valleta (MT)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,678

(22) Filed: Jan. 21, 2016

(65) Prior Publication Data
US 2016/0136521 A1 May 19, 2016

Related U.S. Application Data

(63) Continuation of application No. 14/466,653, filed on Aug. 22, 2014, now abandoned, which is a
(Continued)

(51) Int. Cl.
| | |
|---|---|
| *A63F 13/00* | (2014.01) |
| *A63F 13/26* | (2014.01) |
| *A63F 13/87* | (2014.01) |
| *A63F 13/80* | (2014.01) |
| *A63F 13/213* | (2014.01) |
| *A63F 13/30* | (2014.01) |
| *A63F 13/49* | (2014.01) |
| *A63F 3/06* | (2006.01) |

(Continued)

(52) U.S. Cl.
CPC ............ *A63F 13/26* (2014.09); *A63F 3/0645* (2013.01); *A63F 13/12* (2013.01); *A63F 13/213* (2014.09); *A63F 13/30* (2014.09); *A63F 13/49* (2014.09); *A63F 13/79* (2014.09); *A63F 13/80* (2014.09); *A63F 13/85* (2014.09); *A63F 13/87* (2014.09); *A63F 2009/2435* (2013.01); *A63F 2009/2463* (2013.01); *A63F 2009/2488* (2013.01); *A63F 2300/572* (2013.01)

(58) Field of Classification Search
CPC .......................... A63F 13/12; A63F 2300/572
USPC .................... 463/16–19, 40, 42, 43
See application file for complete search history.

(56) References Cited

U.S. PATENT DOCUMENTS

| | | | | |
|---|---|---|---|---|
| 4,342,454 A | * | 8/1982 | Baer ..................... | A63F 13/10 |
| | | | | 345/672 |
| 5,297,802 A | * | 3/1994 | Pocock .................. | A63F 3/062 |
| | | | | 273/269 |

(Continued)

FOREIGN PATENT DOCUMENTS

| | | |
|---|---|---|
| EP | 2198938 | 6/2010 |
| GB | 2427149 | 12/2006 |

(Continued)

*Primary Examiner* — Michael Cuff
(74) *Attorney, Agent, or Firm* — The Noblitt Group, PLLC (57) ABSTRACT

Methods and apparatus for gaming according to various aspects of the present invention may be implemented in conjunction with a multiplayer game. The game system may identify a winning player for the multiplayer game and notify the winning player of a win condition. The game system may receive a video stream of the winning player's reaction, and substantially concurrently display the video stream to one or more other players of the game.

12 Claims, 7 Drawing Sheets

Related U.S. Application Data continuation of application No. 13/117,593, filed on May 27, 2011, now Pat. No. 8,827,791.

(60) Provisional application No. 61/429,067, filed on Dec. 31, 2010.

(51) Int. Cl.
*A63F 13/79* (2014.01)
*A63F 13/85* (2014.01)
*A63F 9/24* (2006.01)

(56) References Cited

U.S. PATENT DOCUMENTS

| | | | | |
|---|---|---|---|---|
| 5,558,339 | A * | 9/1996 | Perlman | A63F 13/12 463/23 |
| 5,630,006 | A * | 5/1997 | Hirayama | G09B 5/06 386/241 |
| 5,697,844 | A * | 12/1997 | Von Kohorn | H04N 7/0884 348/E7.024 |
| 6,144,375 | A * | 11/2000 | Jain | G06F 17/30017 345/420 |
| 6,352,479 | B1 * | 3/2002 | Sparks, II | A63F 13/12 463/29 |
| 6,724,385 | B2 * | 4/2004 | Takatsuka | A63F 13/10 345/427 |
| 6,783,460 | B2 * | 8/2004 | Galyean, III | A63F 13/12 348/552 |
| 7,798,905 | B2 * | 9/2010 | Thompson | A63F 13/12 463/40 |
| 8,157,635 | B2 * | 4/2012 | Hardy | G07F 17/32 463/17 |
| 8,715,052 | B2 * | 5/2014 | Bennett | G07F 17/32 273/292 |
| 2001/0053967 | A1 * | 12/2001 | Gordon | G06Q 10/10 703/22 |
| 2005/0064926 | A1 * | 3/2005 | Walker | G07F 17/32 463/16 |
| 2005/0114526 | A1 * | 5/2005 | Aoyama | A63F 13/12 709/228 |
| 2006/0247016 | A1 | 11/2006 | Walker et al. | |
| 2006/0251383 | A1 * | 11/2006 | Vronay | G11B 27/034 386/242 |
| 2006/0258446 | A1 * | 11/2006 | Nguyen | G07F 17/3276 463/30 |
| 2007/0117637 | A1 * | 5/2007 | Morgan | A63F 13/12 463/43 |
| 2007/0196806 | A1 * | 8/2007 | Ljungman | G09B 3/00 434/350 |
| 2007/0197295 | A1 * | 8/2007 | DiBlasi | A63F 13/12 463/42 |
| 2008/0043038 | A1 * | 2/2008 | Frydman | G06T 15/00 345/632 |
| 2008/0274798 | A1 * | 11/2008 | Walker | G07F 17/32 463/25 |
| 2009/0094630 | A1 * | 4/2009 | Brown | H04H 60/33 725/12 |
| 2009/0117969 | A1 * | 5/2009 | Englman | G07F 17/3276 463/20 |
| 2009/0131177 | A1 | 5/2009 | Pearce | |
| 2009/0318231 | A1 * | 12/2009 | Lange | G07F 17/3223 463/42 |
| 2010/0004060 | A1 * | 1/2010 | Filipour | G07F 17/3276 463/30 |
| 2010/0160038 | A1 * | 6/2010 | Youm | A63F 13/10 463/29 |
| 2010/0210351 | A1 * | 8/2010 | Berman | G07F 17/3246 463/25 |
| 2011/0022673 | A1 * | 1/2011 | Lueth | H04L 65/605 709/206 |
| 2011/0262103 | A1 * | 10/2011 | Ramachandran | H04N 5/44591 386/240 |
| 2012/0224024 | A1 * | 9/2012 | Lueth | H04L 65/605 348/43 |
| 2013/0023324 | A1 | 1/2013 | Lange | |

FOREIGN PATENT DOCUMENTS

| | | |
|---|---|---|
| JP | 2009125107 | 6/2009 |
| WO | 9719537 | 5/1997 |
| WO | 9966707 | 12/1999 |
| WO | 0100290 | 1/2001 |
| WO | 2008024705 | 2/2008 |

* cited by examiner

METHODS AND APPARATUS FOR GAMING

CROSS-REFERENCES TO RELATED APPLICATIONS

This application is a continuation of U.S. patent application Ser. No. 14/466,653, filed Aug. 22, 2014, titled "Methods and Apparatus for Gaming," which is a continuation of U.S. patent application Ser. No. 13/117,593, filed May 27, 2011, now U.S. Pat. No. 8,827,791, titled "Methods and Apparatus for Gaming," which claims the benefit of U.S. Provisional Patent Application No. 61/429,067, filed Dec. 31, 2010 and titled "Methods and Apparatus for Gaming," and incorporates the disclosure of each application by reference.

BACKGROUND OF THE INVENTION

There are several different multiplayer games available on the Internet, such as role-playing games, adventure games, puzzle games, board games, casino games, and other types of games. Some of these games comprise interactive elements, which make the gaming experience more enjoyable and thus encourage players to play the game more often and for longer periods of time. One example of an interactive element is a feature for chatting, known as "chat." Chat enables players to communicate with each other while playing a game.

Chat typically comprises players sending text comments to each other. Frequently, a player may use chat features to congratulate another player on winning, and the winning player may respond to the congratulations. While chat features and other social features are meaningful, the amount of interactivity is limited, and computer gaming remains a relatively solitary activity.

SUMMARY OF THE INVENTION

Methods and apparatus for gaming according to various aspects of the present invention may be implemented in conjunction with a multiplayer game. The game system may include identifying a winning player for the multiplayer game and notifying the winning player of a win condition. The game system may receive a video stream of the winning player's reaction, and substantially concurrently display the video stream to one or more other players of the game.

Elements and steps in the figures are illustrated for simplicity and clarity and have not necessarily been rendered according to any particular sequence. For example, steps that may be performed concurrently or in a different order may be illustrated in the figures as a sequence to improve understanding of the described embodiments of the present invention.

Elements, operational features, applications, and/or advantages are illustrated by certain exemplary embodiments recited in the disclosure. Representative elements, operational features, applications, and/or advantages of the present invention reside in the details of construction and operation as more fully described or otherwise identified. The description may refer to the accompanying drawings, images, figures, etc., wherein like numerals (if any) refer to like parts throughout.

DETAILED DESCRIPTION OF EXEMPLARY EMBODIMENTS

The present descriptions relate to exemplary embodiments of the invention and the inventor's conception of the best mode and are not intended to limit the scope, applicability or configuration of the invention in any way. Rather, the following description is intended to provide convenient illustrations for implementing various embodiments of the invention. Changes may be made in the function and/or arrangement of any of the elements described in the disclosed exemplary embodiments without departing from the spirit and scope of the invention.

The present invention may be described in terms of functional block components and various processing steps. Such functional blocks may be realized by any number of components configured to perform the specified functions and achieve the various results. For example, the present invention may employ various process steps, apparatus, systems, methods, etc. In addition, the present invention may be practiced in conjunction with any number of systems and methods for gaming; capturing, receiving, recording, streaming, displaying, and storing video and/or audio; and the like, and the system described is merely one exemplary application for the invention. Further, the present invention may employ any number of conventional techniques for streaming video, capturing video, displaying video, and/or conducting a game.

For the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

Various representative implementations of the present invention may be applied to any suitable multiplayer games and other systems, such as any activity involving multiple people. Certain representative implementations may include, for example, systems or methods for streaming video during a multiplayer game. In an exemplary embodiment, a system for gaming may initiate video streaming in a multiplayer game of bingo. Upon a win, a video stream may be captured by a webcam and displayed on another player's computer through a network. Certain representative implementations may also include other applications and/or features in addition to or instead of the video stream upon a win, such as a side game, private chat, or a game host, any or all of which may include video streaming.

The video stream system allows players to watch a winning player's reaction nearly in real time. Players are able to see the emotion and joy other players express when they win. A player may also initiate a side game that displays a video stream of the player playing the game to other players. In addition, there may be a game host with streaming video, and players may initiate a private chat with video streaming. The video stream system gives players a better experience, so they enjoy playing the game more. As a result, players are likely to play more often and for longer periods of time.

Figure 1:
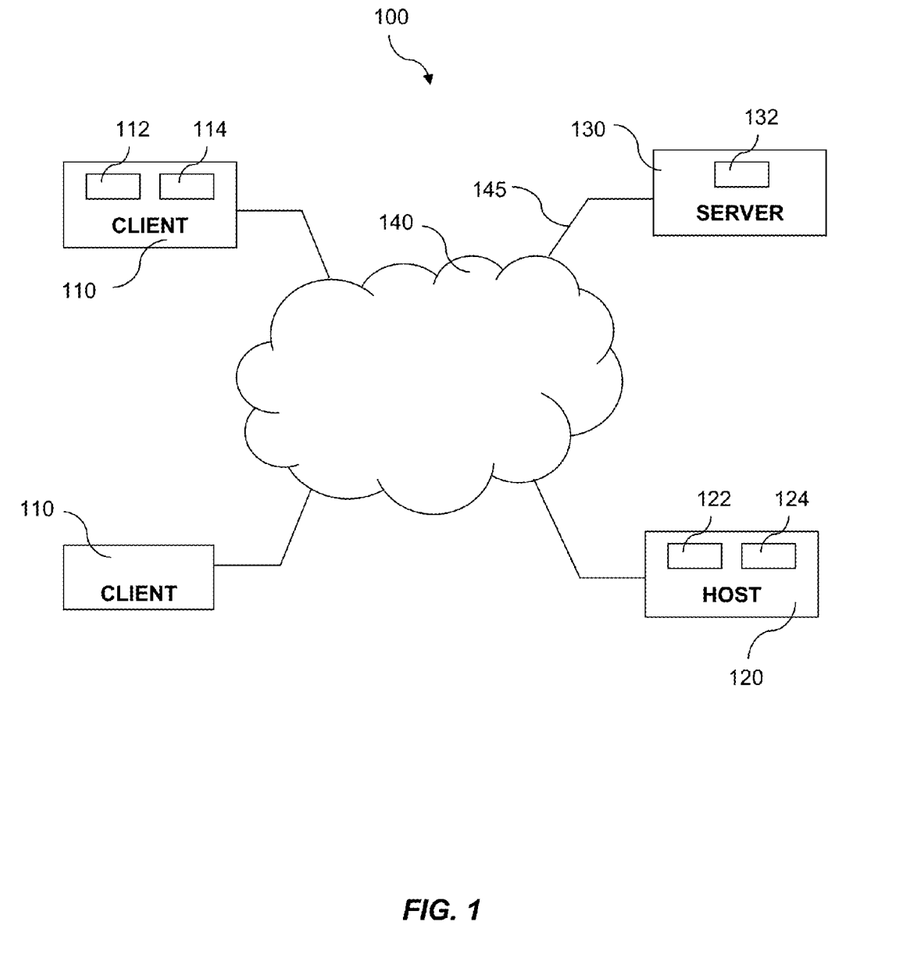
FIG. 1 is a block diagram of a game system including a video stream system according to various aspects of the present invention.

Referring to FIG. 1, a game system 100 according to various aspects of the present invention may operate in conjunction with multiple computers exchanging data for a multiplayer game. For example, the present exemplary game system 100 comprises multiple clients 110 connected to each other via one or more networks. The game system 100 may further comprise one or more hosts 120 and servers 130. Each client 110 may comprise a client application 112 and a webcam 114, each host 120 may comprise a host application 122 and a webcam 124, and each server 130 may comprise a server application 132. Data may be transferred or exchanged among the various clients 110, client applications 112, hosts 120, host applications 122, servers 130, and/or server applications 132 via a communications medium 140 and a network 145.

The communications medium 140 may comprise any suitable medium for transferring information. For example, the communications medium 140 may comprise a hard-wired and/or wireless communications system, and may operate in conjunction with communications protocols, such as the Internet, a local area network, or other suitable electronic network.

The network 145 may comprise multiple devices configured to exchange information via the communications medium 140, such as two or more computers that communicate information with each other. Further, the network 145 may comprise any network of computers using additional or alternative systems for communicating information. The clients 110 and the client applications 112 may communicate via the network 145, for example in conjunction with the host 120, the host application 122, the server 130, and the server application 132. Any appropriate system and device may be connected to the network 145, such as computers, servers, phones, entertainment systems, data sources, and other servers.

The data communicated via the communications medium 140 and/or network 145 between the clients 110, the client applications 112, the host 120, the host application 122, the server 130, and the server application 132 may comprise any suitable data capable of being communicated via the communications medium 140 and/or the network 145. For example, the data may comprise a series of bits, a string of characters, a single digital file, or a collection of files that may comprise documents, images, video files, music files, game data, game files, or other collections of digital information. In various embodiments, the data may comprise game data for playing a game, including a stream of data embodying a video and/or audio stream. The stream may comprise a quasi-continuous flow of data made available via the communications medium 140 and that may be distributed by the clients 110 of the network 145. In one embodiment, the data may comprise analog information that may be distributed via the communications medium 140, for example comprising an analog video and/or audio broadcast.

The clients 110 may receive, store, and/or transmit information via the communications medium 140 and network 145. The clients 110 may comprise any suitable system for communicating via the network 145 and/or the communications medium 140. In various embodiments, the clients 110 may comprise any appropriate device for playing a game via the network, such as a personal computer, a game console, or a phone. For example, one or more clients 110 may comprise conventional computers having a processor and a storage mechanism, such as RAM, hard drives, CD-ROM drives and disks, DVD-ROM drives and disks, BD-ROM drives and disks, or any other appropriate volatile or non-volatile memory system. Alternatively, the clients 110 may comprise a television, stereo, radio, telephone, PDA, personal media device, or other device that transmits data.

In the present embodiment, the clients 110 communicate and transmit data via the medium 140 and the network 145. For example, the clients 110 may comprise conventional computer systems that run operating systems, such as Microsoft Windows, Mac OSX, or Linux, and may execute software and connect to the network 145. The clients 110 may connect to the network 145 in any suitable manner, including via network cable connections or wireless connections. Also, the clients 110 may communicate through the network 145 using any appropriate communication protocols, such as TCP/IP, UDP, etc. In the present embodiment, the clients 110 request and provide information according to software applications. The information transfer functionality may be implemented in any suitable manner, however, such as via hard coding, firmware, or other technique. In one embodiment, a player may use the client 110 to access and play an online multiplayer game, such as bingo, poker, or the like.

In one embodiment, the client 110 operates the client application 112 to exchange data via the communications medium 140 and the network 145, such as in conjunction with playing the game. The client application 112 may comprise any software application or combination of software applications for requesting and/or receiving data via the communications medium 140 and the network 145. The client application 112 may be adapted to operate a processor of the client 110, and may be loaded from local memory on the client 110, from external memory, from remote memory on another computer, or from a combination of the above. Alternatively, the client application 112 may operate on a machine remote from the user, such that the user interacts with the client application 112 via a terminal. In various embodiments, the client application 112 comprises a computer-implemented game or a computer-implemented client portion of a game that may be played with other players via the network 145.

In the present embodiment, the client application 112 may comprise or operate in conjunction with a Web browser application, such as Microsoft Internet Explorer, Apple Safari, Mozilla Firefox, Google Chrome, or Opera. In an alternative embodiment, the client application 112 may be any application adapted to render or display content. For example, the client application 112 may download or receive data from the server 130. The data may comprise code, such as HyperText Markup Language (HTML), Cascading Style Sheets (CSS), JavaScript (JS), or any other appropriate languages, and the code may be embedded in a file or simply transferred as data. The client application 112 may compile, interpret, or otherwise use the data or code to run an application, such as a game or other activity. Further, transferred data may comprise content files, such as images, videos, Adobe Flash, or any other embedded or referenced files that may be used by the client application 112 or any other application running on the client 110, the webcam 114, or any other device connected to or communicating with the client 110. The client application 112 may enable the client 110 to output various types of content, such as video, audio, and the like.

The client application 112 may display downloaded content files, for example using a plug-in or external application. The client application 112 may also display content such as images, graphics, video, text, or any other information. Further, the client application 112 may link to and/or display other information that may be received from the local client 110, the host 120, the server 130, or any other device that may be connected to the medium 140 or the network 145. The client application 112 may continue to communicate and exchange data with the server application 132, another client application 112, or any other application. The client application 112 may send data to or receive data from the server 130, the host 120, or another client 110. The client application 112 may also facilitate communications among the clients 110 and/or host 120, such as text-based messages, audible communications, or visual communication.

The client application 112 may communicate with the webcam 114, such as by sending commands and receiving data. For example, the webcam 114 may receive a command to capture image or video content to be received and processed by client application 112. The client application 112 may then send the captured content to the server application 132 running on the server 130. The client application 112 may also send the captured content to another client 110, the host 120, or any other computer or device. In an alternative embodiment, the server 130, the host 120, or another client 110 may send and receive data directly with webcam 114.

In one embodiment, a player may use the client application 112, which may receive a Flash file from the server application 132 running on the server 130 and initiate a Flash plug-in to run the Flash file in the client application 112. The Flash file may comprise a multiplayer bingo game, or the Flash file may be adapted to display a multiplayer bingo game served by the server application 132. The client application 112, in conjunction with the Flash plug-in and the Flash file, may be adapted to operate the game and continue to communicate with the server application 132. Further, the client application 112 may receive a video stream from the webcam 114 and send the video stream to the server application 132. The client application 112 may also receive and display video streams from the server application 132 along with other game content.

In one embodiment, the webcam 114 may be adapted to capture images, video, and/or audio. The webcam 114 may comprise any suitable device for capturing an image, video stream, and/or audio data, such as a conventional webcam. The client 110 may send a command to webcam 114 to capture content comprising an image, video and/or audio. The webcam 114 may store the content, and/or the client 110 may receive the content. The client application 112 may immediately send the received content to another device, such as the server 130, or the client application 112 may store the content in memory and/or send the received content later. The server 130 may receive the content from the client 110 or receive the content directly from the webcam 114. The server 130 may store the content and/or send the content to another device, such as the client 110 or the host 120. In one embodiment, the webcam 114 may capture an image or video stream, which may be received by the client 110, the server 130, or another client 110. In addition, the captured image or video stream may be sent to another computer, such as the host 120 or another client 110 to be viewed by another player or host. Further, the captured image or video stream may be stored in the client 110, the host 120, the server 130, or any other computer or device.

The server 130 may comprise any suitable computer system or group of systems configured to communicate via the medium 140 and/or the network 145 with any other computer or device, such as the client 110, the host 120, or another server 130. For example, the server 130 may comprise hardware, software, and/or networking components configured to receive and process requests from the clients 110 or the host 120 and provide a suitable Web site or other Internet-based user interface which is accessible by the clients 110 and the host 120. In one embodiment, the server 130 comprises a computer running the server application 132, which may comprise an operating system (e.g. MS Windows, Mac OS X, Linux, etc.), a Web server (e.g. Apache Server, MS Windows Server, etc.), and/or any application or combination of applications adapted to enable the server 130 to communicate and exchange data with another computer or device. The server 130 is also capable of controlling and/or relaying data from another computer or device substantially in real time, such as streaming video from one client 110 or one webcam 114 to another client 110. The server 130 may also communicate with one or more other servers 130, for example, to store data, leverage resources, or the like.

In one embodiment, the server 130 stores data, such as Web site code (e.g., HTML, CSS, and JS), a Flash file, graphics, and text adapted to be retrieved and processed by the client application 112 to run a gaming application. The gaming application allows the client 110 to communicate with the server 130 to send and receive data related to the game, including video streams, which the server 130 sends to other clients 110 or hosts 120. Further, the server 130 may temporarily or permanently store any of the data it sends and receives, including video streams.

The server 130 may operate the server application 132 to exchange data via the communications medium 140 and the network 145. For example, the server application 132 may retrieve data from or send data to the client 110, the host 120, the client application 112, or the host application 122 via the medium 140 and the network 145. The server application 132 may be adapted to operate a processor of the server 130, and it may be loaded from local memory on the server 130, external memory, remote memory on another computer, or a combination of the above.

In the present embodiment, the server application 132 may comprise and/or operate in conjunction with an operating system, a Web server, and/or any application or combination of applications adapted to enable the server 130 to communicate and exchange data with another computer or device. For example, the server application 132 may respond to requests from the client application 112 or the host application 122 by transmitting data from the server 130 or another client 110. The data may comprise code, such as HTML, CSS, JS, or any other languages, and the code may be embedded in a file, such as a text document, an encoded plug-in, or a separate application, or may be simply transferred as data. The data or code may display an application, such as a game or other activity. Further, transferred data may comprise content files, such as images, videos, Adobe Flash, or any other embedded or referenced files that may be used by the client application 112 or any other application running on the client 110, webcam 114, or any other device connected to or communicating with the client 110. The data may comprise links or references that link to data on another server 130, the local client 110 or host 130, another client 110 or host 120, or any other computer or device.

In one embodiment, the server application 132 may receive data, such as a video stream, from the client 110 or host 120 that may be used by the server 130 or server application 132 and/or relayed to another client 110 or host 120. In one embodiment, the server application 132 may directly control and/or access the client webcam 114 or the host webcam 124. The server application 132 may continue to communicate and exchange data with the client application 112, the host application 122, another server application 132, or any other application. The server application 132 may send data to and receive data from the client 110, the host 120, or another server 130.

In one embodiment, the server application 132 may receive a request from the client application 112 or the host application 122 and may respond by sending a Flash file located on the server 130, which initiates a Flash plug-in to run the Flash file in the client application 112 or the host application 122. The Flash file may comprise a multiplayer bingo game, or the flash file may be adapted to display a multiplayer bingo game served by the server application 132. The server application 132 may continue to communicate with the client application 112 or the host application 122 through the Flash plug-in and Flash file, which may be adapted to operate the game and continue to communicate with the server application 132. The server application 132 may receive a video stream from the client application 112 or the host application 122, which it may store locally and/or send to another client application 112 or the host application 122. The server application 132 may send video streams to the client application 112 or the host application 122 along with other game content.

In one embodiment, the host 120 comprises the host application 122 and the host webcam 124, which may function together in a similar manner to the client 110, the client application 112, and the client webcam 114, respectively. For example, the host 120 may operate the host application 122, which may communicate with the clients 110, client applications 112, the server 130, and/or the server application 132. Further, the host 120 may access the host webcam 124 to capture image, video, and/or audio data and stream it to the server 130. In one embodiment, the host 120 may ensure the players, operating on clients 110, follow the rules and policies of the game, chat, and any functions of a game room. The host 120 may comprise a moderator, an administrator, a selected player, or any other suitable operator. The host 120 may be a real person or may be an automated or system-generated character.

Referring to FIGS. 2-5, methods and apparatus for video stream may comprise one or more windows for conducting and interfacing with an application, such as a multiplayer game. The application interface may be configured in a variety of layouts to conduct a game or application with a video stream. FIGS. 2-5 demonstrate one embodiment of an interface for a multiplayer game with a video stream.

Figure 2:
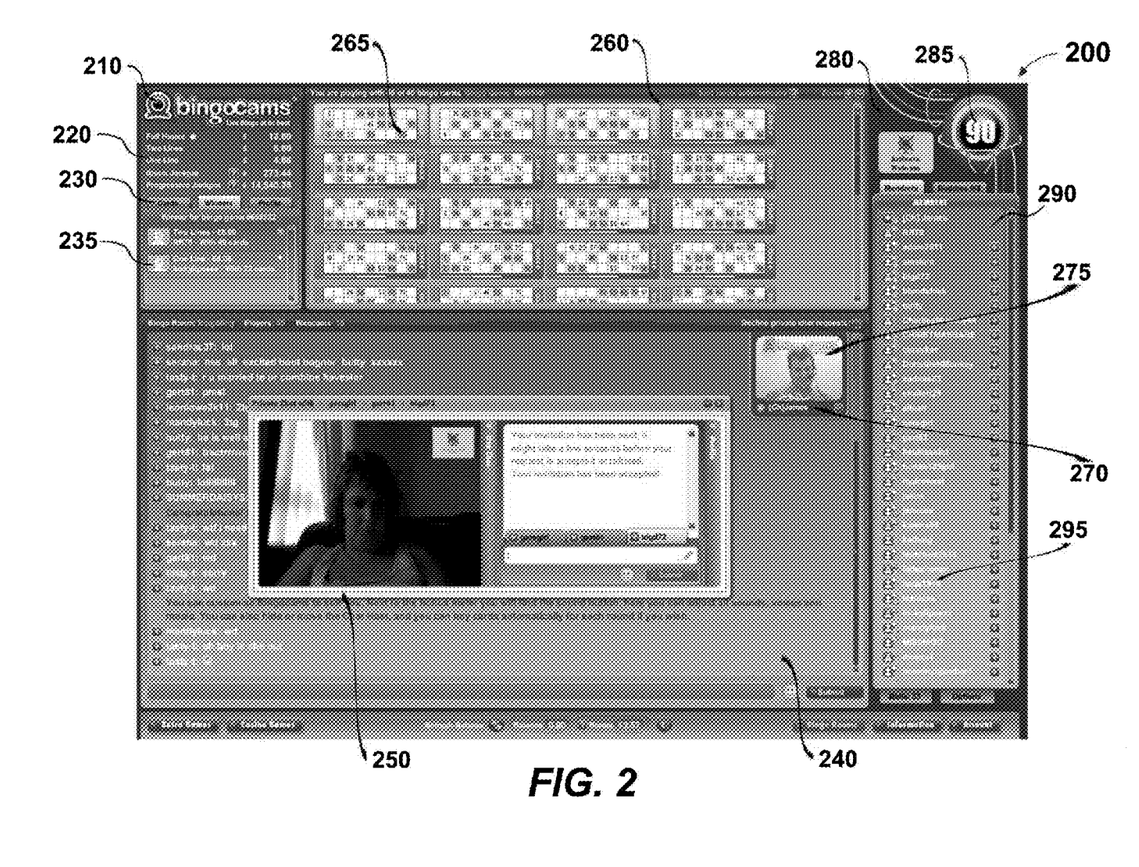
FIG. 2 representatively illustrates an interface for a bingo game with a video stream.

Referring to FIG. 2, methods and apparatus for video stream may comprise a platform 200 for conducting a multiplayer game. The platform 200 may represent a main screen of the multiplayer game. The platform 200 may be loaded using data received from another computer (e.g., server 130), the local computer, or a combination. The platform 200 may be designed or configured with a combination of client-side or server-side code languages, such as Flash, HTML4, HTML5, CSS, JS, ASP.net, PHP, Java, ColdFusion, or any other suitable languages. Further, the platform 200 may use an HTTP protocol or any other suitable protocol to communicate with the server 130, the server application 132, the host 120, the host application 122, another client 110, and/or another client application 112. The configuration of the platform 200 may change in design and/or content as the multiplayer game is played.

The platform 200 may comprise any suitable multiplayer game. For example, the platform 200 may comprise a role-playing game, an adventure game, a puzzle game, a board game, a casino game, or any other type of interactive game. For any given multiplayer game, the platform 200 may be adapted to identify a winning player, notify a player that the player won, receive a video stream, and/or display a video stream. The system for gaming may use the platform 200 to initiate video streaming in any suitable game.

In one exemplary embodiment, the platform 200 may comprise a bingo game application. The bingo game may be played in real time. The bingo game application may be a virtual representation of an in-person bingo game. A bingo game may comprise players each with one or more game boards, which may each comprise a set of squares marked with characters, such as numbers or letters. One or more squares may be marked as a bonus or free square. The game boards may be nine squares by three squares (9×3), five squares by five squares (5×5), or any other appropriate size. The game boards may be square, rectangular, or any other suitable shape. The characters may be drawn as a series of ball-shaped objects that are announced to the players. There may be a wild, bonus, or free character, which may be used on any square. Any number of characters may be drawn in a single bingo game, such as 90, 75, or any other suitable number. The platform 200 may automatically mark the squares as the characters are announced or may require the players to manually mark the characters.

Winning the game may be determined by any condition or criteria, such as entirely or partially filling one or more lines of the board (vertically, horizontally, or diagonally), filling the entire board, or any other suitable condition. A win condition may also comprise a random event, a wild character, a bonus ball, or any other event. The platform 200 may represent a single bingo game played in a given game room, which may be selected by the player or automatically selected. There may be several game rooms with different levels of play, strategies, types of players, and the like. There may be several players connected to the bingo game and playing from their respective clients 110. The various elements or areas of platform 200 may be defined by frames, windows, overlays, layers, sections, tables, or any other suitable design.

The platform 200 may comprise a logo 210, which may comprise a company name, design, and/or contact information, as well as any other information a game company or sponsor may want to display. The platform 200 may comprise a statistics area 220. The statistics area 220 may comprise the player's balance amount, the amount won by the player, the amount won by all players in the room, the room jackpot amount, the progressive jackpot amount, and/or any other useful statistics regarding the game.

The platform 200 may comprise information relating to the game and other players, such as via one or more information tabs 230. The information tabs 230 may comprise a list of winning players. The information tabs 230 may comprise a player listing 235 for each player who has won during the current game. The player listing 235 may comprise a username, a photo, an avatar (e.g., if no photo is available), a link to close private chat with that player, a link for more details or a profile about the player, and/or any other suitable information about the winning player. The information tabs 230 may also comprise a ticket entry module, which may be used to purchase any number of game tickets. The ticket entry module may display the price per ticket, the number of tickets, the total price, a bonus, and any other information that may be useful when purchasing game tickets. Further, the information tabs may comprise information included in the player's profile as well as the ability to edit the information.

The platform 200 may comprise tools for communicating with the host 120 or other players, such as a chat area 240. The chat area 240 may display a list of messages posted by players, a game host, administrators, system messages, and/or any other appropriate messages. Each message may further identify who wrote the message with a photo, a link to more information, such as details or a profile, and/or a link to view a detailed profile or enter a private chat. Further, the chat area 240 may comprise an input element for a player to enter a message to be posted in the chat area 240.

The platform 200 may comprise a game board area 260, which may comprise one or more game boards 265. The game board 265 may comprise live (currently being played) game boards, past game boards, game boards that will be played in the future, or any other suitable game boards. A player may purchase one or more game boards 265. The game board area 260 may show any number of game boards 265.

Each game board 265 may comprise any number of squares comprising numbers, letters, words, or any other suitable characters. For example, the game board 265 may comprise 27 squares in a 3×9 layout. In an alternative embodiment, the game board 265 may comprise 25 squares in a 5×5 layout. The game board 265 layout may also use other shapes or be designed in any suitable layout. Further, the game board 265 may comprise one or more bonus spaces.

In one embodiment, the platform 200 may draw a current ball 285 and display the current ball 285 in a ball selection area 280. The ball selection area 280 may display one or more balls, such as the current ball 285. In one embodiment, the current ball 285 comprises a graphic element drawn to represent a ball. The current ball 285 displays the character that the platform 200 is drawing at the instant moment. The ball selection area 280 may display an animation of the ball 285 being drawn. The ball selection area 280 may also comprise a history of balls previously drawn.

The platform 200 may automatically mark the spaces of each game board 265. For example, the platform 200 may automatically mark the space on each game board comprising the character shown on the current ball 285. The platform 200 may use one color to designate the spaces that were won most recently and a second color to designate the spaces that were won previously. A third color or no color may be used to designate the spaces that have not been won. The colors may be automatically selected and/or a player, a moderator, an administrator, or another user may manually choose the colors to be used. Alternatively, a player may be allowed or required to manually mark each winning space as the current ball 285 is announced.

The platform 200 may comprise a game host area 270. In one embodiment, the game host area 270 may comprise a live video stream 275 of a person hosting the room from a separate computer, such as the host 120. The game host area 270 may also comprise text communications between the host, one or more players, and any other appropriate users. The game host area 270 may also show delayed or pre-recorded video streams. The platform 200 may also display details about the host 120, link to a profile of the host 120, or display any other suitable information.

The platform 200 may also comprise a list of players 290, such as a list of players currently playing a game. In one embodiment, the list of players 290 may comprise a list of players playing in the game room. The list of players 290 may comprise a player listing 295 for each player currently playing the game. The player listing 295 may comprise information similar to player listing 235. Further, the player listing 295 may comprise a link to initiate chat (private or public) with the listed player, or, if chat is already initiated, the player listing 295 may comprise a link to close chat with that player.

The platform 200 may comprise a video stream area 250. The video stream area may be configured in any appropriate area or manner to present a video stream and/or other relevant information to the user. For example, the video stream area 250 may be defined by a window, such as in a separate pop-up window, overlay, or layer. In an alternative embodiment, the video stream area 250 may comprise a separate section or frame of the platform 200. Further, video stream area 250 may comprise the embodiments mentioned below in FIGS. 3-5.

Figure 3:
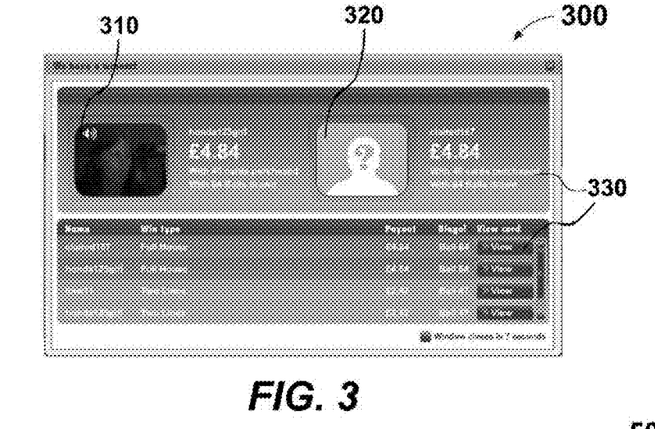
FIG. 3 representatively illustrates an interface for viewing a video stream of a winning player's reaction.

Referring to FIG. 3, the platform 200 may operate a child element, such as in the video stream area 250, which displays a win moment area 300. The win moment area 300 may display one or more video streams of one or more players winning the multiplayer game, such as the game in platform 200. The win moment area 300 may be loaded using data received from another computer (e.g., server 130), from the local computer, or a combination. For example, the win moment area 300 may comprise a live video stream 310 of a player, such as the user of the client 110, winning the game. In another embodiment, the win moment area 300 may comprise a delayed or pre-recorded video stream 310. Alternatively, if a video stream is unavailable or a player has disabled video streams, the win moment area 300 may display an avatar 320. The win moment area 300 may display multiple video streams 310 and/or avatars 320. Further, the win moment area 300 may display details 330, such as details of the game, the win, information about the player, or links to a profile or any other suitable information. The system or a player may optionally disable the win moment area 300 and/or video streams.

Figure 4:
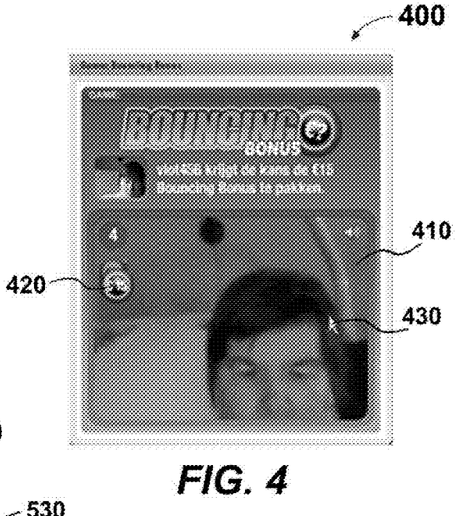
FIG. 4 representatively illustrates an interface for viewing a video stream of a player playing a side game.

Referring to FIG. 4, the platform 200 may operate another child element, such as in video stream area 250, which displays a side game area 400. The side game area 400 may display one or more video streams of one or more players playing a side game. The side game area 400 may be loaded using data received from another computer (e.g., server 130), the local computer, or a combination. In one embodiment, the side game area 400 may comprise a live video stream 410 of a player, such as a client 110, playing the side game. In another embodiment, the side game area 400 may comprise a delayed or pre-recorded video stream 410. Alternatively, if a video stream is unavailable or a player has disabled video streams, the side game area 400 may display an avatar playing the game. The side game area 400 may display multiple video streams 410 and/or avatars.

The side game area 400 may also display side game objects 420, such as bouncing balls, as well as a mouse pointer 430 representing the mouse location on the player's screen. Further, the side game area 400 may display details, such as details of the game, information about the player, or links to a profile or any other suitable information. The system or a player may optionally disable the side game area 400 and/or video streams.

The side game area 400 may comprise any game, activity, and/or interaction involving one or more players, participants, and/or viewers. The side game area 400 may comprise entirely different content than the content in the platform 200 or may comprise content that is related to and/or an extension of the content in the platform 200. For example, in one embodiment, while the platform 200 conducts a bingo game, one or more players may play an entirely different game in the side game area 400. In another embodiment, one or more players may use side game area 400 to place a side bet related to the game taking place in platform 200.

Figure 5:
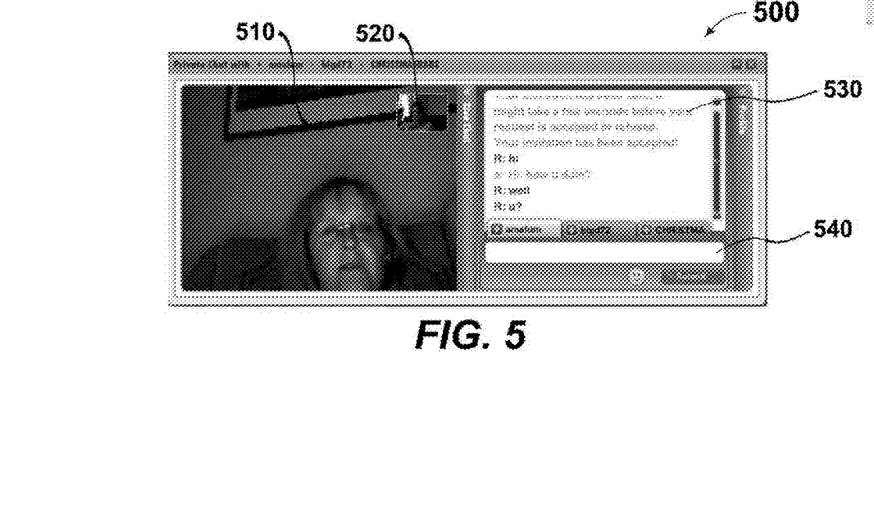
FIG. 5 representatively illustrates an interface for viewing a video stream of a player in private chat.

Referring to FIG. 5, the platform 200 may operate other child elements, such as in the video stream area 250, for example a private chat area 500. The private chat area 500 may display one or more video streams of one or more players participating in the private chat area 500. The private chat area 500 may be loaded using data received from another computer (e.g., server 130), the local computer, or a combination. In one embodiment, the private chat area 500 may comprise a live video stream 510 of another player, such as another client 110, participating in private chat. In another embodiment, the private chat area 500 may comprise a delayed or pre-recorded video stream 510. Alternatively, if a video stream is unavailable or a player has disabled video streams, the private chat area 500 may display an avatar. The private chat area 500 may display multiple video streams 510 and/or avatars.

The private chat area 500 may display any number of the video streams. For example, the private chat area 500 may display one video stream, all of the video streams, or any other configuration as determined by the system or otherwise set by the player, a moderator, or an administrator. In addition, the private chat area 500 may display one or more video streams in a larger-size display and the other video streams in a smaller-size display. The private chat area 500 may display one or more video streams in a picture-in-picture format. The private chat area 500 may allow a player to switch between feeds, such as by clicking on a smaller-size display to activate it and make it display as a larger-size display. The private chat area 500 may also display a player's own video feed to that player.

The private chat area 500 may display a list of text messages 530 posted by players, a game host, administrators, system messages, and/or any other appropriate messages. Each message may further identify who wrote the message with a photo, a link to more information, such as details or a profile, and/or a link to view a detailed profile or enter a private chat.

Further, the private chat area 500 may comprise an input element 540 for a player to enter a message to be posted in the list of text messages 530. Further, the private chat area 500 may display details, such as information about the players participating in the private chat, links to profiles, or any other suitable information. The system or a player may optionally disable the private chat area 500 and/or video streams.

Figure 6:
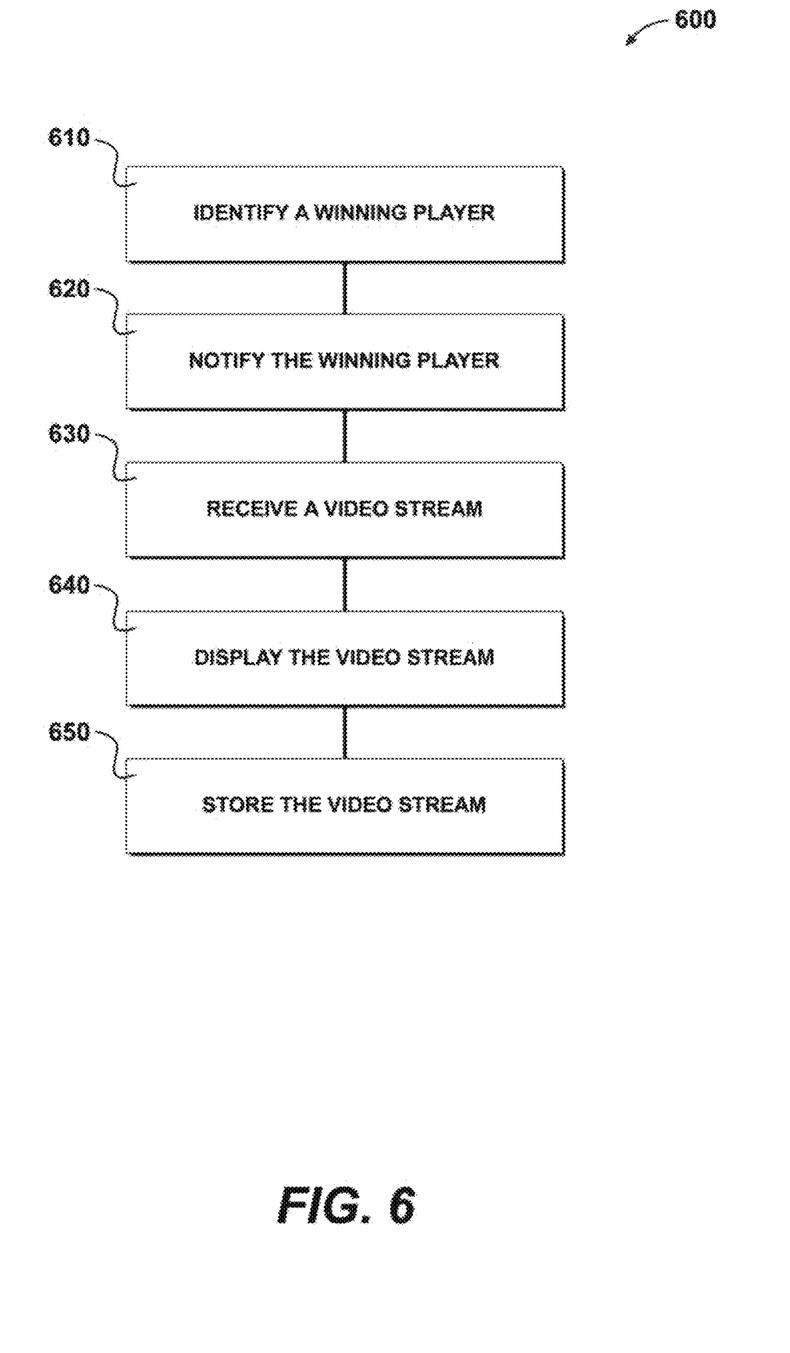
FIG. 6 is a flow diagram of a system for video stream according to various aspects of the present invention.

Referring to FIG. 6, a system for video stream 600 may capture, receive, record, display, and/or store a video stream of a player winning a multiplayer game. The video stream of the winning player at the winning moment may be displayed to other players, such as other players in the same game room. For example, the system may identify a winning player playing a multiplayer game, such as bingo or poker (610). The system for video stream 600 may identify multiple winning players at the same time. The identification may comprise a trigger or flag that determines that a player has met a win condition. For example, the client application 112 and/or the server application 132 may be adapted to determine that a player has met a win condition, such as by comparing a player's condition to a win condition any time a condition changes such that a player may have met a win condition. A win condition may comprise any predetermined parameters or may be a random or spontaneous determination. In one embodiment, a win condition may comprise a player winning at a game of bingo, which may comprise entirely or partially filling a single line, filling two lines, filling every space, or any other pre-determined win condition. In another embodiment, a win condition may comprise a player winning at poker, which may comprise winning an entire game, winning a hand, advancing, being dealt a certain card, or any other pre-determined win condition. Further, in a game of roulette, a win condition may comprise a player winning any of a number of bets or any other pre-determined win condition, or in a game of Risk, a win condition may comprise a player taking over a territory, a continent, winning the game, or any other pre-determined condition. The system for gaming may define a win condition as any change, no matter the significance, for any game, whether it be a role-playing game, an adventure game, a puzzle game, a board game, a casino game, or any other type of game. A win condition may comprise winning at and/or accomplishing any pre-determined condition in any game as determined by the rules of the game.

Upon identifying a winning player, the system for video stream 600 may notify the winning player of the win condition (620). The winning player may be notified of the win condition in any suitable manner. For example, notifying a winning player may comprise the client application 112 or server application 132 providing an alert using text, audio, video, graphics, sound effects, an LED display, or any other mechanism that may notify a player of the win. Further, notifying a winning player may comprise the player independently determining that he or she has met the win condition.

The system for video stream 600 may receive a video stream of the reaction of the winning player to the win condition notification (630). In one embodiment, the video stream may be captured by a recording system, such as the webcam 114, that is adapted to capture images, video, and/or audio. In another embodiment, the video stream may be captured by a digital camera, a video camera, a surveillance system, a hidden camera, a monitoring device, or any other system or device adapted to capture images, video, and/or audio. The video stream may be received by the client application 110 or the server 130 and processed by the client application 112 or the server application 132. The video stream may be received for any length of time, which may be set by the player, a moderator, or an administrator. Further, receiving the video stream may begin prior to notifying the winning player of the win condition. For example, receiving the video stream may begin after identifying the winning player but prior to notifying the winning player of the win condition, so that the system may capture the entire reaction. In another embodiment, the system may already be receiving video prior to identifying the winning player (e.g., if the player is in a private video chat or is playing a side game) and thus continues to receive video to capture an upcoming reaction.

The system for video stream 600 may display the video stream of the reaction of the winning player to the win condition (640). The system may display the video stream to one or more players, including the winning player who was recorded, other players, and/or any appropriate non-players. The video stream may be displayed 640 substantially concurrently with receiving the video stream 630.

The system may display the video stream to one player, any subset of players, all the players participating in a game or in a game room, or any other appropriate people or systems. In one embodiment, video streams of all winning players at the time of notification are broadcast to all of the players participating in a game. The system may display an avatar instead of the video stream in certain situations, such as if no video stream is available or if a player has disabled capturing, recording, storing, or receiving the video stream. For example, the system may display one video stream, all of the video streams, or any other configuration as determined by the system or otherwise set by the player, a moderator, or an administrator. In addition, the system may display one or more video streams in a larger-size display and the other video streams in a smaller-size display. The system may display one or more video streams in a picture-in-picture format. The system may allow a player to switch between feeds, such as by clicking on a smaller-size display to activate it and make it display as a larger-size display. The system may also display a player's own video feed to that player.

The system may display the video stream on any suitable display screen, such as a computer monitor, a projector, a television, a smartphone, a kiosk, or any other suitable display screen. Further, the system may display the video stream on a Web site, in an application, on a television program, or in any other suitable environment. The system may display the video stream as an embedded object, a pop-up window, a floating layer, or any other object during a game, on a Web site, in an application, or on any other suitable platform.

The duration and timing of the video stream may also be selected according to any desired parameters. For example, to display each winning player's reaction to the other players at the time of the win notification, the video stream from the winning player's webcam may be broadcast to the other players beginning substantially at the time of notification and proceeding a selected amount of time. In one embodiment, the video stream of each winning player continues to be broadcast for about 3-15 seconds. Longer durations may be selected for players' enjoyment, while shorter durations may be selected to promote rapid and interesting play.

The system for video stream 600 may store the video stream of the reaction of the winning player to the win condition (650). The system for video stream 600 may store the entire duration of video stream received or it may store a portion of it, such as an edited version. The system for video stream 600 may also store multiple versions, such as one version that is complete and another version that is used for promotional display. The video stream may be stored in a short-term memory, long-term memory, such as a hard drive or solid-state drive, or any other suitable medium. The video stream may also be used later, such as to show winning moments for promotional purposes (e.g., "hall of fame"). For example, the system for video stream 600 may give the winning player the option of whether to store the prior win. The system may present the winning player with a bonus for agreeing to have the win stored and/or displayed at a later time. For example, a player may receive an additional percentage of the winnings as a bonus if the player agrees that the video stream may be stored and displayed for promotional purposes. In one embodiment, the video stream may be featured on a Web site or other promotional materials to promote the excitement of the game to prospective players. The video stream may be featured with a series of other video streams or it may be featured by itself, such as in a banner advertisement. A shorter or edited version of the video stream may be displayed. For example, the video stream may be edited to show a compelling portion, or a video stream may be featured in a compilation of various video streams.

Further, the video stream may be displayed so that it may be judged. For example, other players, visitors to a Web site, and/or any other applicable viewers of the video may judge the video, such as by giving it a rating, or by voting for it or against it among a set of videos. The video stream may be judged or reviewed during or immediately after the initial broadcast, or the video stream may be stored and judged during a playing of the recording. There may also be categories of winning videos, such as best, most creative, funniest, most enthusiastic, or any other appropriate categories, as well as winning videos during a given time period, such as "best winning video of the month." Prizes may also be distributed for any number of videos, such as first place, second place, third place, and so on.

Figure 7:
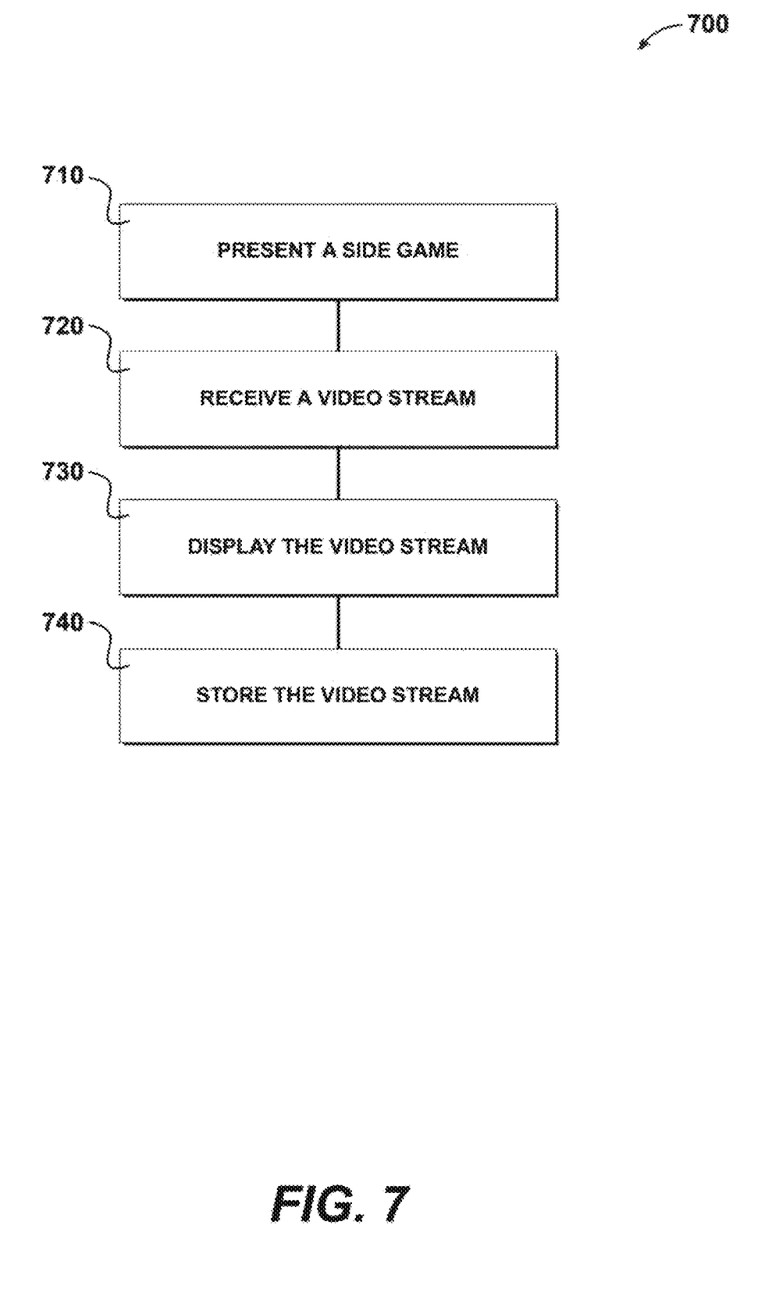
FIG. 7 is a flow diagram of a system for a side game according to various aspects of the present invention.

Referring to FIG. 7, a system for a side game 700 may capture, receive, record, display, and/or store a video stream of a player playing a side game. The system may present a side game, such as the side game 400 (710). The system may require a player to agree to participate in the side game and/or display the video stream. The side game may comprise any suitable game. In one embodiment, the side game comprises a series of balls bouncing up on the screen, on which the player must successfully click to receive extra bonus money. The system may display the side game for any amount of time. In one embodiment, the side game gives the player about ten seconds to play. The system may use any suitable criteria for deciding how, when, and to which players to present the side game. In one embodiment, the system may present the side game to a player randomly, but it may also choose only from players that have purchased cards, have an active webcam, and/or have private chat enabled. The system may receive a video stream, such as video stream 410, from the player playing the side game (720).

The system for a side game 700 may display the received video stream to a single player or a group of players (730). The group of players may be all players, just the players in the game room, or any other group of players determined by the system. In one embodiment, a player may opt-out of receiving the video stream. The system for a side game 700 may display an avatar instead of the video stream in certain situations, such as if no video stream is available or if a player has disabled capturing, recording, storing, or receiving the video stream. The system for a side game 700 may simultaneously record and display video streams of multiple players playing the side game. Thus, step 730 may display any number of video streams. For example, the system may display one video stream, all of the video streams, or any other configuration as determined by the system or otherwise set by the player, a moderator, or an administrator.

In addition, the system for a side game 700 may display one or more video streams in a larger size and the other video streams in a smaller size. The system for a side game 700 may display one or more video streams in a picture-in-picture format. The system for a side game 700 may also display a player's own video feed to that player. Further, the system for a side game 700 may store the received video stream (740) in a process similar to the step of storing a video stream 650.

In one embodiment, the side game is presented randomly or at selected intervals during the main bingo game. When the side game begins, a player is selected to play the side game. Any player may be selected, such as a random player, a winning player, a frequent player, or the like. In one embodiment, only players having an active webcam are eligible to be selected for the side game so that the video stream of the player may be broadcast to the other players while the side game is played.

The video stream may be broadcast regardless of how successful the player is. The system may receive the video stream (720) and display the video stream (730), in a process similar to steps 630 and 640, such that the system may display a video stream substantially concurrently with receiving the video stream. Thus, the system may display the video stream while the player is playing the game and prior to knowing how successful the player is.

The image of a bouncing ball may be superimposed over the video stream window of the player such that the ball appears to be bouncing around within the window while the player attempts to click on the ball. The player may have a selected amount of time to successfully click on the ball to win. Otherwise, the player loses and the window showing the winning player is removed to facilitate further play.

Figure 8:
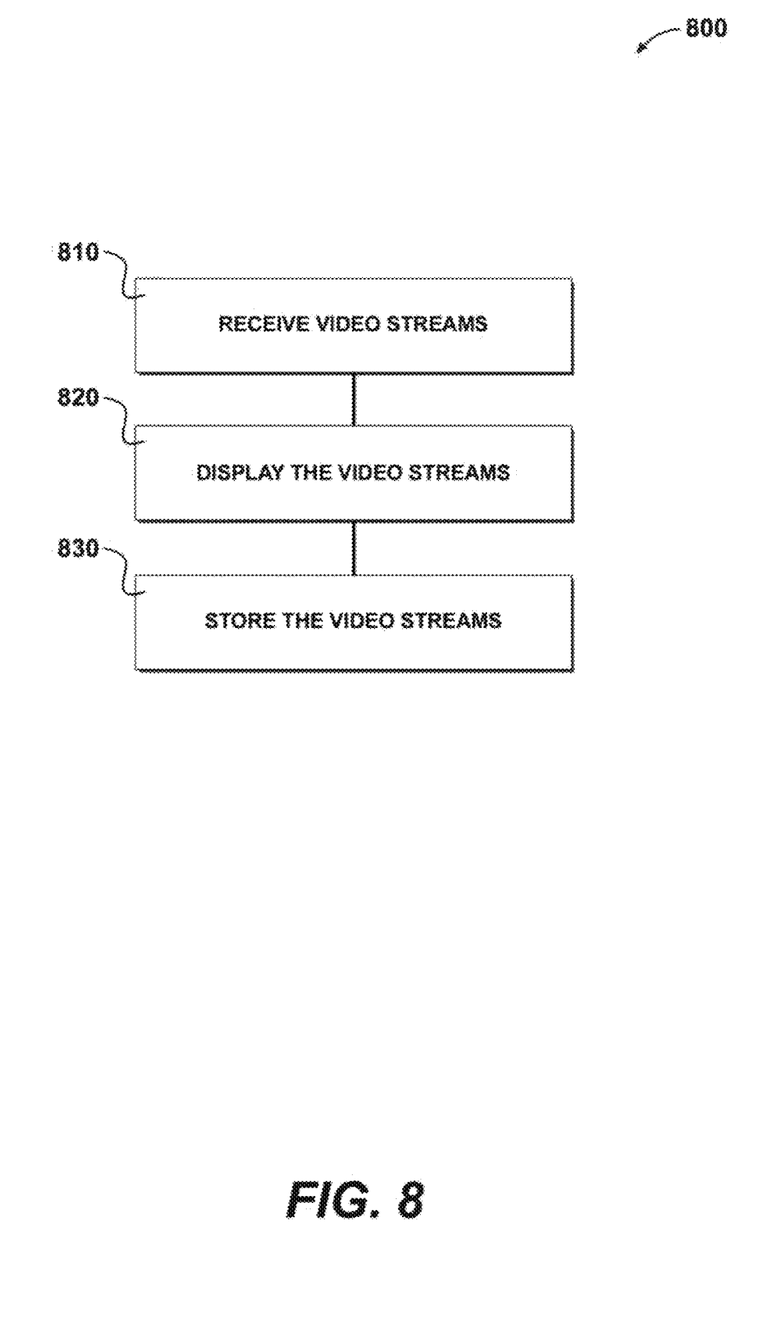
FIG. 8 is a flow diagram of a system for a private chat according to various aspects of the present invention.

Referring to FIG. 8, a system for private chat 800 may capture, receive, record, display, and/or store one or more video streams of players participating in a private chat. The system for private chat 800 may receive a video stream, such as video stream 510, from each of one or more players participating in a private chat (810). The step of receiving the video streams 810 may be similar to the step of receiving a video stream 630, 720. The system for private chat 800 may require a player to agree to participate in the private chat and/or display the video stream.

The system for private chat 800 may display the received video streams to all the players participating in private chat (820), which may comprise one or multiple other players. The system may display any suitable number of the video streams. The system for private chat 800 may display an avatar instead of the video stream in certain situations, such as if no video stream is available or if a player has disabled capturing, recording, storing, or receiving the video stream. For example, the system for private chat 800 may display one video stream, all of the video streams, or any other configuration as determined by the system or otherwise set by the player, a moderator, or an administrator.

In addition, the system for private chat 800 may display one or more video streams in a larger-size display and the other video streams in a smaller-size display. The system for private chat 800 may display one or more video streams in a picture-in-picture format. The system for private chat 800 may allow a player to switch between feeds, such as by clicking on a smaller-size display to activate it and make it display as a larger-size display. The system for private chat 800 may also display a player's own video feed to that player. Further, the system for private chat 800 may store the received video streams (830) in a process similar to the step of storing a video stream 650, 740.

Figure 9:
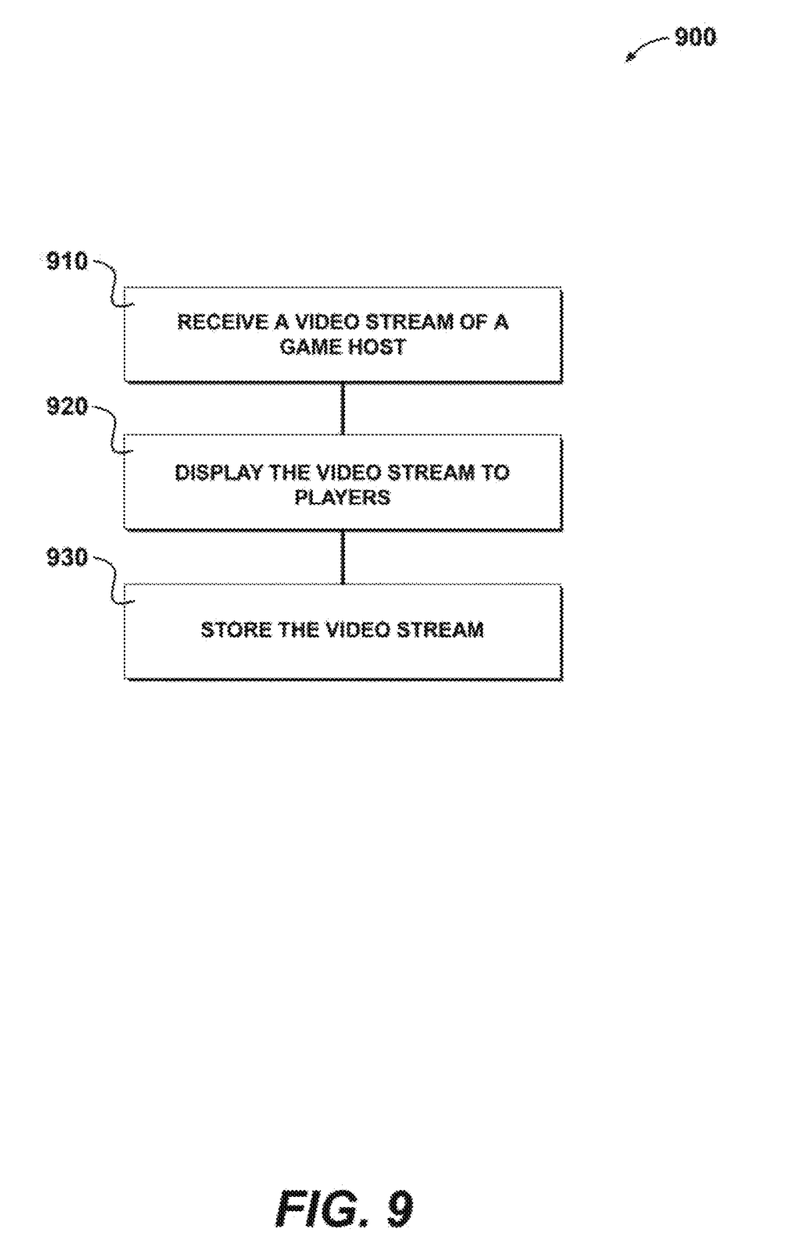
FIG. 9 is a flow diagram of a system for a game host according to various aspects of the present invention.

Referring to FIG. 9, a system for a game host 900 may capture, receive, record, display, and/or store a video stream of a game host. The system for a game host 900 may receive a video stream, such as video stream 275, from a game host, such as host 120 (910). The game host may be any appropriate person or entity, such as a live person monitoring the game play, providing commentary, answering questions, or providing additional entertainment. Alternatively, the game host may be automated or otherwise implemented.

The system for a game host 900 may display the received video stream to a single player or a group of players, such as those players playing in a given game room (920) or otherwise participating in a game, such as players or spectators. There may be multiple video streams for multiple game hosts, moderators, administrators, or the like. The system for a game host 900 may display an avatar instead of the video stream in certain situations, such as if no video stream is available, or if a host or a player has disabled capturing, recording, storing, or receiving the video stream. The system for a game host 900 may display no video streams, one video stream, all of the video streams, or any other configuration as determined by the system or otherwise set by the player, a moderator, or an administrator. In addition, the system for a game host 900 may display one or more video streams in a larger size and the other video streams in a smaller size. The system for a game host 900 may display one or more video streams in a picture-in-picture format. Further, the system for a game host 900 may store the received video stream (930) in a process similar to the step of storing a video stream 650.

In the foregoing specification, the invention has been described with reference to specific exemplary embodiments. Various modifications and changes may be made without departing from the scope of the present invention as set forth in the exemplary embodiments. The specification and figures are to be regarded in an illustrative manner, rather than a restrictive one and all such modifications may be included within the scope of the present invention. For example, the steps recited in any method or process embodiments may be executed in any appropriate order and are not limited to the specific order presented in the embodiments. Additionally, the components and/or elements recited in any apparatus embodiment may be otherwise assembled or operationally configured to produce substantially the same result and are accordingly not limited to the specific configurations recited in the embodiments.

Various benefits, advantages, and solutions to problems have been described with regard to particular embodiments. Any benefit, advantage, solution to problems, or any element that may cause any particular benefit, advantage, or solution to occur or to become more pronounced are not to be construed as critical, required, or essential features or components of any or all the embodiments.

Elements in the figures, drawings, images, etc. are illustrated for simplicity and clarity and have not necessarily been drawn to scale. For example, the dimensions of some of the elements in the figures may be exaggerated relative to other elements to help improve understanding of various embodiments of the present invention. Furthermore, the terms 'first', 'second', and the like herein, if any, are used for distinguishing between similar elements and not necessarily for describing a sequential or chronological order. Moreover, the terms 'front', 'back', 'top', 'bottom', 'over', 'under', and the like in the disclosure and/or in the provisional embodiments, if any, are generally employed for descriptive purposes and not necessarily for comprehensively describing exclusive relative position. Any of the preceding terms so used may be interchanged under appropriate circumstances such that various embodiments of the invention, for example, are capable of operation in configurations and/or orientations other than those explicitly illustrated or otherwise described.

The terms "comprises", "comprising", "including", or any variation thereof, are intended to reference a non-exclusive inclusion, such that a process, method, article, composition, or apparatus that comprises one or more elements does not include only the elements recited, but may also include other elements not expressly listed or inherent to such process, method, article, composition or apparatus. Other combinations and/or modifications of the described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the disclosed invention.

The invention claimed is:

1. A computer-implemented method of conducting a real-time online multiplayer game via a network having a server and a plurality of client computers connected to the server, the method comprising:
    identifying, by at least one of the server or a first client computer, a winning player playing the real-time online multiplayer game at a first remote location;
    notifying, by at least one of the server or the first client computer over the network, the winning player of a win condition;
    capturing, by a video camera communicatively coupled to, and operated by, the first client computer, a video stream comprising a physical reaction performed by the winning player in reaction to the win condition notification;
    transmitting the video stream in real-time to at least one of the plurality of additional client computers via the network from at least one of the server or the first client computer to a second remote location; and
    displaying the video stream in real-time, at the second remote location to a second player playing the real-time online multiplayer game.

2. A computer-implemented method according to claim 1, wherein displaying the video stream to a second player playing the online multiplayer game comprises displaying the video stream to all players playing the online multiplayer game.

3. A computer-implemented method according to claim 1, wherein the winning player comprises a plurality of winning players.

4. A computer-implemented method according to claim 1, wherein the online multiplayer game is bingo.

5. A non-transitory medium storing instructions executable by a machine, wherein the instructions cause the machine to execute a method of conducting a real-time online multiplayer game via a network having a server and a plurality of client computers connected to the server, the method comprising:
    identifying, by at least one of the server or a first client computer, a winning player playing the real-time online multiplayer game at a first remote location;
    notifying, by at least one of the server or the first client computer over the network, the winning player of a win condition;
    capturing, by a video camera communicatively coupled to, and operated by, the first client computer, a video stream comprising a physical reaction performed by the winning player in reaction to the win condition notification;
    transmitting the video stream in real-time to at least one of the plurality of additional client computers via the network from at least one of the server or the first client computer to a second remote location; and
    displaying the video stream at the second remote location to a second player playing the real-time online multiplayer game.

6. A non-transitory medium according to claim 5, wherein displaying the video stream to a second player playing the online multiplayer game comprises displaying the video stream to all players playing the online multiplayer game.

7. A non-transitory medium according to claim 5, wherein the winning player comprises a plurality of winning players.

8. A non-transitory medium according to claim 5, wherein the online multiplayer game is bingo.

9. A computer system for conducting a real-time online multiplayer game via a network having a server and a plurality of client computers connected to the server, comprising:
    a memory; and
    a processor coupled to the memory, wherein the processor is adapted to:
        identify, by at least one of the server or the first client computer, a winning player playing the real-time online multiplayer game at a first remote location;
        notify, by at least one of the server or the first client computer over the network, the winning player of a win condition;
        capture a video stream comprising of a physical reaction of performed by the winning player to the win condition notification by a video camera communicatively coupled to, and operated by, the first client computer;
        transmit the video stream in real-time to at least one of the plurality of additional client computers via the network from at least one of the server or the first client computer to a second remote location; and
        display, at the second remote location, the video stream to a second player playing the real-time online multiplayer game.

10. A computer system according to claim 9, wherein displaying the video stream to a second player playing the online multiplayer game comprises displaying the video stream to all players playing the online multiplayer game.

11. A computer system according to claim 9, wherein the winning player comprises a plurality of winning players.

12. A computer system according to claim 9, wherein the online multiplayer game is bingo.

* * * * *